Patented Oct. 3, 1939

2,174,628

UNITED STATES PATENT OFFICE 2,174,628

METHOD OF WELDING AND SOLDERING

Hans Gerull, Vienna, Austria

No Drawing. Application March 1, 1938, Serial No. 193,364. In Austria April 17, 1937

1 Claim. (Cl. 113—112)

This invention relates to methods of welding and soldering. In the production of electric leads for use in glass vessels such as electric light bulbs, wireless valves, and the like, it is generally necessary to butt weld more than two lengths of wire consisting of different metals and of different diameters, or to solder the same together. This work is effected in automatic machines working on the autogenous principle, the procedure being to unwind the wire from supply rolls, cut off the required lengths, arrange these lengths in the requisite relative positions, and finally to press these lengths of wire firmly up against each other. Welding flames are then brought into contact with the wire at the butt joints, by imparting a swinging or oscillating movement to appropriately mounted welding burners, so that the abutting wire ends are heated to such a degree that they fuse and weld together. Owing to the fact that pressure is exerted upon the wire elements in the direction of their length a slight upsetting is effected with the result that a strong and permanent joint is obtained. From the nozzles of the welding burners there issues without interruption the mixture of burning gas, e. g. hydrogen or a non-oxidizing mixture of acetylene and oxygen, and heating gas, e. g. oxygen which is ignited to form the welding flame. The joints produced in this manner have, however, the disadvantage of not being perfectly homogeneous; since the welding must take place very rapidly an excess of heating gas must be used, and as a consequence partial oxidation or burning at the joints, with the formation of scale, takes place. This scale is swept by the welding flame into the interior of the fused nodule, so that it may happen as a consequence that the electric conductivity of the welded wires is greatly diminished, and when the welded wires are inserted in glass vessels and electric current passed therethrough in the normal course of the operation of such vessels the weld joints or nodules are consequently apt to heat, with the result that the glass vessel cracks at the point at which the wire is sealed therein. The particles of scale adhering to the outer surface of the wires at the welded joints have a deleterious effect owing to the fact that their coefficient of expansion differs from that of glass, which circumstance is also capable of leading to rupturing of the glass vessel in use.

Similar drawbacks are met with in the usual methods of autogenous welding, in chain welding, and in fact wherever mutually abutting surfaces have to be welded together without the formation of scale.

A further drawback of the known method indicated above is that the welding burners must be so moved as to bring the flame out of contact with the wire as soon as the welding has been effected, in order to avoid melting away of the metal. On the other hand when this is done the surrounding air acts upon the weld and likewise gives rise to oxidation at this point.

To obviate these drawbacks it is proposed in accordance with the present invention to effect mixing of the burning gas with the heating gas only at the instant at which the welding or soldering is to be effected, and up to that instant to allow a flame of the burning gas only to play upon the joint at which the welding or soldering is to be effected. In this manner the joint is maintained in the protective atmosphere of the burning gas flame and thus saved from attack by the oxygen in the air. In place of the oscillable burner hitherto used it becomes possible, in accordance with the invention, to use a stationary burner from the nozzle of which the burning gas flame issues uninterruptedly and bathes the joint to be welded. The burner is equipped with means for admitting the heating gas to the flame at the requisite moment, so that the heating gas is fed only intermittently to the burning gas flame, with the result that the flame only develops the fusing temperature for a certain definite length of time. Such means may consist for example of a valve interposed in the gas feed line to the nozzle and so operated in dependence on a cam that it is suddenly opened and immediately closed again at the required moments.

After the welding operation has been performed the welded joint cools down to the temperature of the burning gas flame, and this temperature must of course be so low that the pieces of material welded together do not fall apart.

A further advantage of the method according to the present invention, as compared with the known method outlined above, is that a saving of gas is achieved, and that the burners need no longer be made movable but may be stationary.

All that has been said applies equally and analogously to brazing and soldering, insofar as these operations are performed autogenously.

I claim:

That method of butt welding thin wires which consists in bringing the wires into alined and contacting relation, preheating the joint only of said wires below welding temperature in a non-oxidizing flame completely surrounding and protecting said joint from air oxidizing effects and then temporarily adding a combining and temperature increasing gas to the flame to raise the temperature of the joint to welding heat at the instant at which welding is to be effected.

HANS GERULL.